Oct. 17, 1939.    S. J. HURWITT    2,176,345
ANT EXTERMINATOR
Filed Oct. 1, 1938
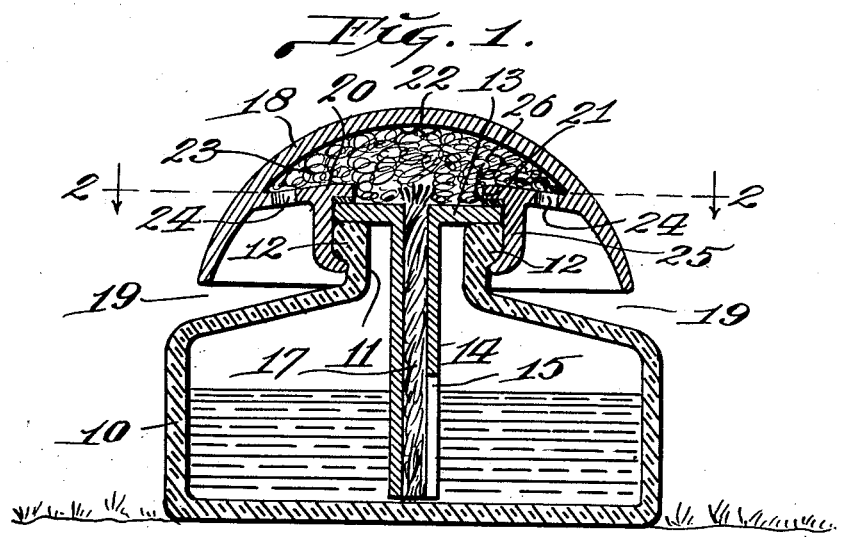
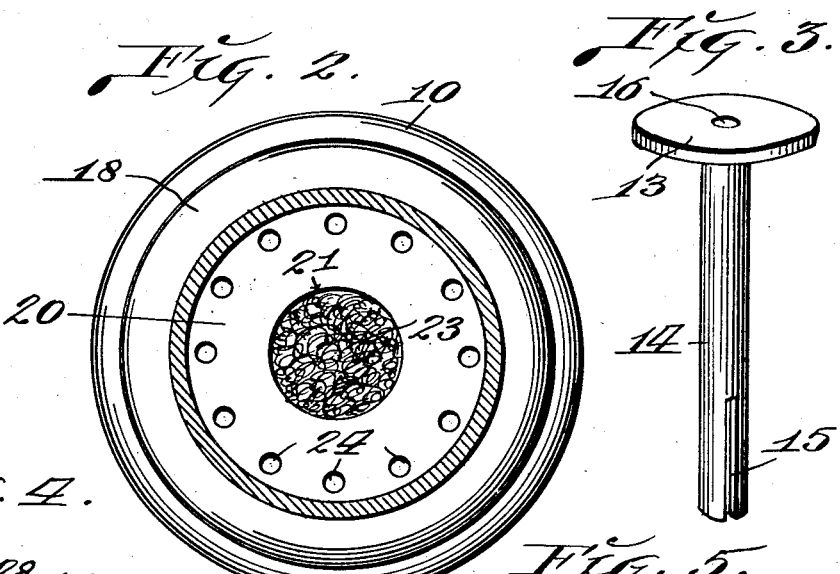
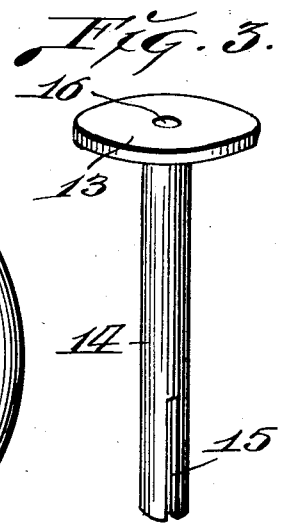
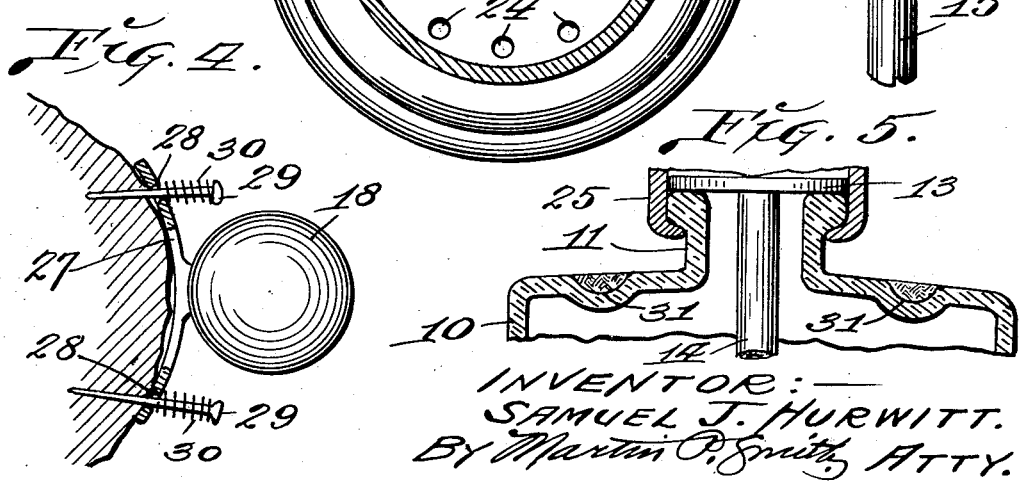
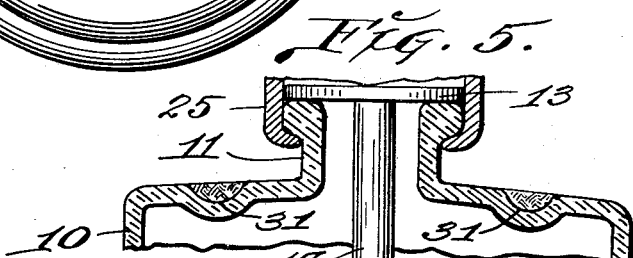
INVENTOR:—
SAMUEL J. HURWITT.
By Martin P. Smith, ATTY.

Patented Oct. 17, 1939

2,176,345

UNITED STATES PATENT OFFICE 2,176,345

ANT EXTERMINATOR

Samuel J. Hurwitt, Los Angeles, Calif.

Application October 1, 1938, Serial No. 232,777

7 Claims. (Cl. 43—131)

My invention relates to an ant exterminator and has for its principal objects the provision of a relatively simple, practical and inexpensive device that may be utilized for the effective extermination of ants and, the construction of the device being such as to prevent the liquid insecticide from becoming spilled in the event that the device is upset or turned over.

Further objects of my invention are, to provide an ant exterminator having its upper portion shaped so as to shed water, thus affording complete protection for the body of fibrous material that is saturated with the liquid insecticide and which saturated body is located in the upper portion of the protective top, further, to provide an ant exterminator constructed so that it is impossible for dead ants to clog the openings through which the ants obtain access to the insecticide and further, to construct the device so that it is practically impossible for children, birds, poultry and animals, such as cats and dogs, to obtain access to the insecticide.

A further object of my invention is, to provide an ant exterminator of the character referred to wherein a body of absorbent material is positioned in the upper portion of the dome-shaped top of the device and said body of absorbent material being supplied with the liquid insecticide by means of a wick which passes from the liquid insecticide container upwardly to the body of absorbent material.

With the foregoing and other objects in view, my invention consists in certain novel features of construction and arrangement of parts that will be hereinafter more fully described and claimed and illustrated in the accompanying drawing in which:

Fig. 1 is a vertical section taken through the center of an ant exterminator constructed in accordance with my invention.

Fig. 2 is a horizontal section taken on the line 2—2 of Fig. 1.

Fig. 3 is a perspective view of a tubular wick-containing member utilized in the exterminator.

Fig. 4 is a plan view partly in section showing a modified form of the exterminator that is applicable for use on a tree, post, or wall.

Fig. 5 is a cross section taken through the upper portion of a modified form of the liquid insecticide container.

Referring by numerals to the accompanying drawing which illustrates a preferred embodiment of my invention, 10 designates a container preferably formed of glass, porcelain, or the like, and the body of which may be either round or angular in horizontal section. The height of the body which is short is preferably considerably less than the diameter of the body and, projecting upwardly from the central portion of the top of the container is a short neck 11 that terminates in a lip 12.

Thus, the shape of the container is such that it projects a limited distance only above the surface of the ground on which it rests, so that the ants are not obliged to travel very far in reaching the insecticide contained in the cap or cover of the container.

Resting on top of the lip 12 around the mouth of the container, is the outer edge of a disc 13 from the center of which depends a tube 14, the lower end thereof terminating immediately above the bottom of the container and, extending from the lower end of this tube upwardly for a short distance is a slot 15. An opening 16 is formed in the center of disc 13, which opening communicates with the passage way through tube 14.

Tube 14 contains a wick-like member 17 of absorbent fibrous material, for instance, cotton waste or the like, and the upper end of this wick projects a short distance above the top of disc 13.

The cap or cover for the device comprises a low dome-shaped member 18, preferably formed of metal, the diameter of which may be greater or less than the diameter of the container 10 and the lower edge of this dome-shaped member 18 terminates a short distance above the upper outer portion of the container 10, thus providing a circumferential slot or opening 19 through which ants may readily pass to reach the insecticide. This annular slot or space 19 is restricted in order to prevent children, birds, poultry, and animals, from obtaining access to the insecticide.

The shape of member 18 is such that it readily sheds rain and sprinkled water and consequently prevents the water from coming into direct contact with the body of fibrous material that is impregnated with the liquid insecticide and which is contained in a chamber beneath the central portion of the covering member 18.

Formed integral with covering member 18 on the under side and a substantial distance above the lower edge thereof, is a horizontally disposed partition 20 in the center of which is formed an opening 21, the diameter of said opening being less than the diameter of the disc 13.

As a result of this arrangement, a chamber 22 is formed immediately beneath the central portion of the covering member 18 and this chamber is filled with absorbent material 23, preferably fibrous material such as cotton waste and, the lower central portion of this absorbent body is in direct contact with that portion of the wick 17 that projects above disc 13.

The outer portion of the partition 20 inclines slightly downward toward the point where said partition unites with the covering member 18 and, formed in this inclined portion of the partition are apertures 24 through which ants may have ready access to the liquid insecticide with which the fibrous body 23 is impregnated.

By slightly inclining the outer portion of the partition 20, any free liquid insecticide that may drain from the outer portion of the absorbent filling 23 will by gravity flow toward the openings 24. Depending from the under side of the partition 20, is a circular flange 25 that surrounds the disc 13 and the lip 12 on the upper end of the neck of the container and, after the entire covering member has been applied to the container the lower portion of this flange 25 is bent inwardly beneath the shoulder at the lower end of lip 12, thus in effect permanently mounting the covering member on the container.

If desired, a thin washer 26 may be positioned between the edge of disc 13 and the under side of partition 20 around the opening 21 therein and, a similar washer (not shown) may be positioned between the under side of the outer portion of disc 13 and the top of lip 12 and which washers function to prevent leakage of any liquid insecticide from the absorbent fibrous body 23 downwardly between flange 25 and the lip and neck of the container.

Container 10 is partially filled with liquid insecticide and by capillary attraction the liquid insecticide passes through slot 15, thence upwardly through the work 17 and impregnates the fibrous body 23.

Ants attracted by the odor of the insecticide crawl up the external surface of the container, thence upwardly over the surface of flange 25 and feed on the insecticide through the openings 24. In the event of the immediate death of the ants, their bodies will drop downward onto the upper portion of the container 10 and thence downwardly onto the surface of the ground immediately adjacent the container, so that the openings 24 are not clogged with the bodies of dead ants and, thus the device will function continuously.

The size and shape of the container 10 are such that, if the same is turned on its side or even turned upside down, there can be no escape and consequent waste of the liquid insecticide, due to the fact that when the device is on its side or upside down the body of liquid insecticide within the container is out of contact or registration with the slot 15.

Inasmuch as the slot 15 extends to the lower end of the tube 14 and the lower end of the latter is positioned immediately adjacent the upper surface of the bottom of the container, the exterminator will continue to function until all of the liquid insecticide has been drawn from the container into the wick 17 and body 23 of absorbent fibrous material.

The modified construction illustrated in Fig. 4 is designed for use on trees, posts, a wall, or the like, and in such construction a plate 27, preferably of metal, is formed integral with or connected to depending flange 25 or to the lower edge of the member 18 and, formed through the end portions of this plate are apertures 28. Passing through these apertures and driven into a tree, post, or wall, are nails 29, the outer portions of which project outwardly from the plate 27 and interposed between the heads of the nails and the plate are expansive springs 30. By thus yieldingly mounting the device on a support such as a tree, post, or the like, the danger of breakage or possibility of disarrangement as a result of being struck by an extraneous object is minimized.

In the modified construction illustrated in Fig. 5, the top wall of the insecticide container is shown provided in its upper surface with a depression 31 which may be circular in form or a series of depressions and, this depression is filled or partially filled with a lure having an odor that is particularly attractive to ants and like insects, but which lure is of such a nature, for instance, being sufficiently hard as to prevent its being eaten or removed by ants or the like.

Such lure may be in the form of a wax, or the like, containing animal fat or other substances having an odor that attracts ants and the like, and which lure after being prepared and melted is run into the depression or depressions and becomes hardened when cold.

Thus, the hardened substance in the depression provides a lure that is especially attractive to ants and other insects.

Insects attracted by the lure after finding that they can not eat or carry the same away will, in their search for food travel around the upper portion of the container and the under side of the covering member will finally enter the apertures 24 and feed upon the liquid insecticide with which the body of fibrous material in the cap or cover is impregnated.

Among the special advantages of my improved ant exterminator are, the constructions which are effective in preventing clogging of the apertures through which the ants have access to the liquid insecticide, by the bodies of dead ants, also the protection of the liquid insecticide and the absorbent material from rain and water from a hose or lawn sprinklers and further, the construction that minimizes tendency of the liquid insecticide to evaporate.

A further advantage of my improved construction is, that even though the device is turned on its side or turned upside down there can be no leakage of the liquid insecticide, due to the fact that the level of the body of liquid will be below the slot 15 and the open lower end of the tube 14 through which the lower portion and end of the wick are exposed. This same condition exists after the exterminating devices have been prepared for use and are packed for storage or transportation.

In some instances it may be found desirable to locate the body of the container 10 below the surface of the ground, thus leaving the covering member only above the ground surface and, such use effectually prevents the device from being turned over or upset.

Thus it will be seen that I have provided an ant exterminator that is relatively simple in construction, inexpensive of manufacture and very effective in performing the functions for which it is intended.

It will be understood that minor changes in the size, form and construction of the various parts of my improved ant exterminator, may be made and substituted for those herein shown and described, without departing from the spirit of my invention, the scope of which is set forth in the appended claims.

I claim as my invention:

1. In an ant exterminator, a receptacle adapted to contain liquid insecticide, a cover for said receptacle, said cover having a rounded upper surface, a wall within said cover and arranged to form a chamber in the upper portion of said cover, a body of absorbent fibrous material in said chamber, said wall being provided with openings which permit ants to have access to the chamber containing the absorbent fibrous material, a tube extending from said cover downwardly into said receptacle and a wick extending through said tube for conveying liquid insecticide from the receptacle to the fibrous body within said chamber.

2. In an ant exterminator, a receptacle adapted to contain liquid insecticide, a cover applied to said receptacle, said cover having a rounded upper surface, the lower edge of which cover is spaced a short distance from the upper portion of the body of the receptacle, a body of absorbent material contained in the upper portion of the cover, said cover being provided with openings that permit ants to have access to the body of absorbent material in the upper portion of said cover and a wick of absorbent material extending from the body of absorbent material in the upper portion of the cover downwardly into the lower portion of said receptacle.

3. In an ant exterminator, a receptacle adapted to contain liquid insecticide, a short neck projecting upwardly from said receptacle, a cover applied to said neck, a body of absorbent material contained in the upper portion of said cover, there being apertures contained in the cover below said body of absorbent material so as to permit ants to have access to said body of fibrous material, a tube extending from said cover downwardly through said neck into the lower portion of said receptacle and a wick extending through said tube, the upper end of which wick is in contact with the body of absorbent material in said cover.

4. An ant exterminator as set forth in claim 3 and the lower portion of said wick-containing tube being provided with a longitudinally disposed slot.

5. In an ant exterminator, the combination with a receptacle adapted to contain liquid insecticide and provided in its upper portion with an opening, a cover applied to said receptacle for closing said opening, said cover being provided in its upper portion with a chamber for the reception of a body of absorbent material, there being openings formed in the wall of the cover beneath the chamber therein to permit ants to have access to the absorbent material contained in said chamber and a wick extending from the lower portion of said receptacle upwardly through the opening in the top of said receptacle and contacting with the body of absorbent material contained in said chamber.

6. In an ant exterminator, a receptacle adapted to contain liquid insecticide, a cover for said receptacle, there being a chamber formed in the under side of the cover, a body of fibrous absorbent material in said chamber, a wick extending from the lower portion of the receptacle into said chamber and a non-edible lure on the upper portion of said receptacle.

7. In an ant exterminator, a receptacle adapted to contain liquid insecticide, a cover for said receptacle, there being a chamber formed in the under side of the cover, a body of fibrous absorbent material in said chamber, a wick extending from the lower portion of the receptacle into said chamber, there being a depression formed in the upper portion of said receptacle and a non-edible lure contained in said depression.

SAMUEL J. HURWITT.